United States Patent
Nieman et al.

(10) Patent No.: US 8,100,364 B2
(45) Date of Patent: Jan. 24, 2012

(54) ANTI-ICING PICCOLO TUBE STANDOFF

(75) Inventors: Ronald J. Nieman, Colwich, KS (US); Jason M. Hughes, Wichita, KS (US)

(73) Assignee: Textron Innovations Inc., Providence, RI (US)

( * ) Notice: Subject to any disclaimer, the term of this patent is extended or adjusted under 35 U.S.C. 154(b) by 515 days.

(21) Appl. No.: 12/354,557

(22) Filed: Jan. 15, 2009

(65) Prior Publication Data

US 2010/0176243 A1    Jul. 15, 2010

(51) Int. Cl.
*B64D 15/02* (2006.01)

(52) U.S. Cl. ............ 244/134 B; 244/134 R

(58) Field of Classification Search .......... 244/134 R, 244/134 A, 134 B, 134 E
See application file for complete search history.

(56) References Cited

U.S. PATENT DOCUMENTS

| | | | | |
|---|---|---|---|---|
| 2,091,395 A * | 8/1937 | Perrin | .............. | 244/134 C |
| 2,142,699 A * | 1/1939 | Riddle | ............... | 244/134 B |
| 2,320,870 A * | 6/1943 | Johnson | .............. | 244/123.8 |
| 2,556,736 A * | 6/1951 | Palmatier | ............. | 244/134 B |
| 3,623,684 A * | 11/1971 | Kline | ............... | 244/134 A |
| 3,889,903 A * | 6/1975 | Hilby | ............... | 244/207 |
| 3,917,193 A * | 11/1975 | Runnels, Jr. | ............. | 244/207 |
| 3,933,327 A * | 1/1976 | Cook et al. | ............. | 244/134 B |
| 4,099,691 A * | 7/1978 | Swanson et al. | .......... | 244/207 |
| 4,603,824 A | 8/1986 | McArdel | | |
| 4,894,569 A | 1/1990 | Lardiere, Jr. et al. | | |
| 4,982,121 A | 1/1991 | Lardiere, Jr. et al. | | |
| 5,011,098 A | 4/1991 | McLaren et al. | | |
| 5,228,643 A | 7/1993 | Manda et al. | | |
| 5,314,145 A | 5/1994 | Rauckhorst, III | | |
| 5,489,073 A | 2/1996 | Leffel et al. | | |
| 5,531,405 A | 7/1996 | Goldberg | | |
| 5,558,304 A | 9/1996 | Adams | | |
| 5,590,854 A | 1/1997 | Shatz | | |
| 5,807,454 A | 9/1998 | Kawabe et al. | | |
| 5,841,079 A | 11/1998 | Parente | | |
| 6,003,814 A * | 12/1999 | Pike et al. | .............. | 244/134 B |
| 6,079,670 A * | 6/2000 | Porte | ............... | 244/134 B |
| 6,467,730 B2 * | 10/2002 | Laugt | ............... | 244/134 B |
| 6,702,233 B1 * | 3/2004 | DuPont | ............. | 244/134 B |
| 7,708,227 B2 * | 5/2010 | Al-Khalil | ............. | 244/134 D |
| 7,854,412 B2 * | 12/2010 | Al-Khalil | ............. | 244/134 R |
| 7,900,872 B2 * | 3/2011 | Sternberger | .......... | 244/134 C |
| 2009/0152401 A1 * | 6/2009 | Sternberger | .......... | 244/134 B |

FOREIGN PATENT DOCUMENTS

EP          436243 A2 *    7/1991
* cited by examiner

*Primary Examiner* — Benjamin P Lee
(74) *Attorney, Agent, or Firm* — Lathrop & Gage LLP

(57) ABSTRACT

A standoff structure for an anti-icing piccolo tube wherein a flexible structure is formed from support ribs, a support bar and a diverter bar for supporting the piccolo tube within the slat or other aircraft leading edge, and for diverting hot gas from the piccolo tube across the inner surface of the slat or other aircraft leading edge.

15 Claims, 6 Drawing Sheets

ANTI-ICING PICCOLO TUBE STANDOFF

BACKGROUND OF THE INVENTION

1. Field of the Invention

The invention relates generally to aircraft. More specifically, the invention relates to ice protection systems for aircraft, including ice protection systems that utilize piccolo tubes to heat, among other potential elements, the leading edge of slats, wing and horizontal stabilizer structures with hot gases.

2. Description of the Related Art

Ice protection systems that utilize hot gases to heat the leading edge of slats and wing structures have been described for use in aircraft. The ice protection systems often use a tube, commonly known as piccolo tube because of numerous spray holes in the tube, to direct hot gas, often from engine bleed air, to the leading edge of the structure to be heated. The hot gas is then channeled to the appropriate area of the surface through the holes in the piccolo tube.

The piccolo tubes are often mounted on the internal structures of the leading edge of the structure to be heated, and the tubes and the spray holes in the tubes are separated by a distance from the surface to be heated. The hot gas delivered by the piccolo tube must be channeled to the appropriate surface of the leading edge. In the past this has occasionally been accomplished by using structures built into the interior or the surface of the leading edge or the piccolo tube itself to maintain the distance from the leading edge surface to the tube and to direct the flow of hot gas.

Composite materials are commonly used to form the piccolo tube in the slat, with structures built into the surface of the tube for the purpose of directing the hot gas across the slat surface and for maintaining the fixed separation between the piccolo tube and the slat. Piccolo tubes formed from composite materials may degrade after continued exposure to the pressure, elevated temperatures and moisture associated with the operation of the piccolo tube. The delaminated tube and resulting debris may not allow sufficient flow downstream to provide the desired ice protection. Such failures often occur in the higher pressure and temperature sections of the piccolo tube, such as near the hot gas inlet.

Piccolo tubes formed from metal better resist the harsh conditions, but have high rates of heat transfer at the locations of contact with the slat, leading to localized heating at the point of contact, and relatively less heating across the other surface area of the slat.

The anti-ice piccolo tube standoff described herein allows for the use of a metal piccolo tube without the excessive heat transfer or other problems related to the use of metal piccolo tubes in other designs.

SUMMARY

The invention is defined by the claims below. An embodiment of the invention includes a standoff structure for positioning the anti-icing piccolo tube in appropriate relation to the wing structure. An embodiment of the invention includes a standoff structure for directing the flow of hot gas from the anti-icing piccolo tube across the surface to be heated.

DETAILED DESCRIPTION

Figure 1B:
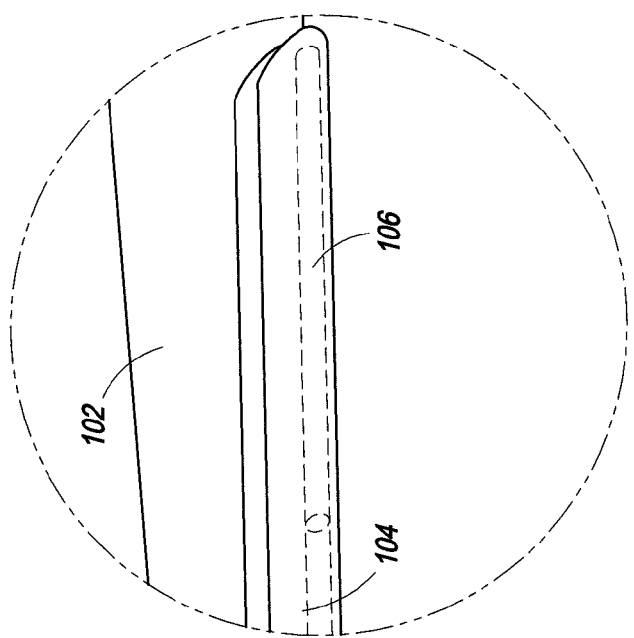
FIG. 1B is a detail perspective view of a portion of an aircraft incorporating an embodiment of the anti-icing piccolo tube standoff structure.
Figure 1A:
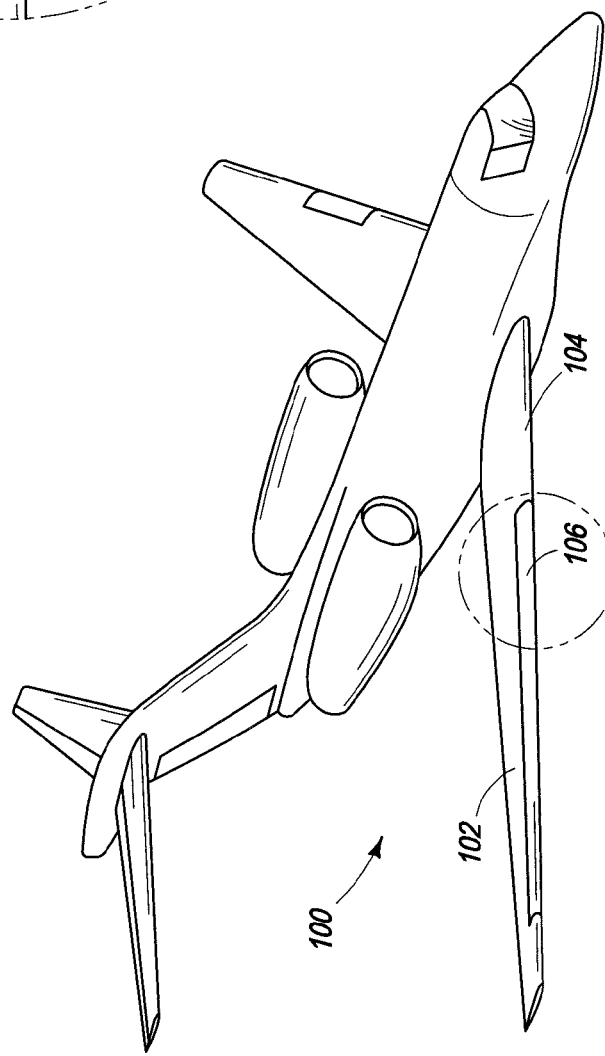
FIG. 1A is a perspective view of an aircraft incorporating an embodiment of the anti-icing piccolo tube standoff structure.

Referring now to FIG. 1A, a perspective view is shown of an aircraft 100 incorporating an embodiment of the anti-icing piccolo tube standoff structure. The aircraft 100 has wings 102, each of which has a leading edge 104. The type and shape of aircraft 100 is not an aspect of the anti-icing piccolo tube standoff structure, and is not limiting of the invention.

During certain flight regimes, the aerodynamic performance of the wing 102 is improved by extending slat 106 from the leading edge 104 to change the shape of the wing 102. The section of the wing 102 that extends forward and down from the wing 102 is the slat 106. The detail section of FIG. 1B shows the slat 106 located on the leading edge 104 in an extended position.

Like other portions of the wing 102, slat 106 is subject to potential icing in certain environmental conditions. Various means of providing heat to the slat 106 have been utilized to prevent ice buildup on the outer surface of the slat 106, including the delivery of hot gases, often from the engine bleed air, to the inside surface of the skin of slat 106.

Figure 2:
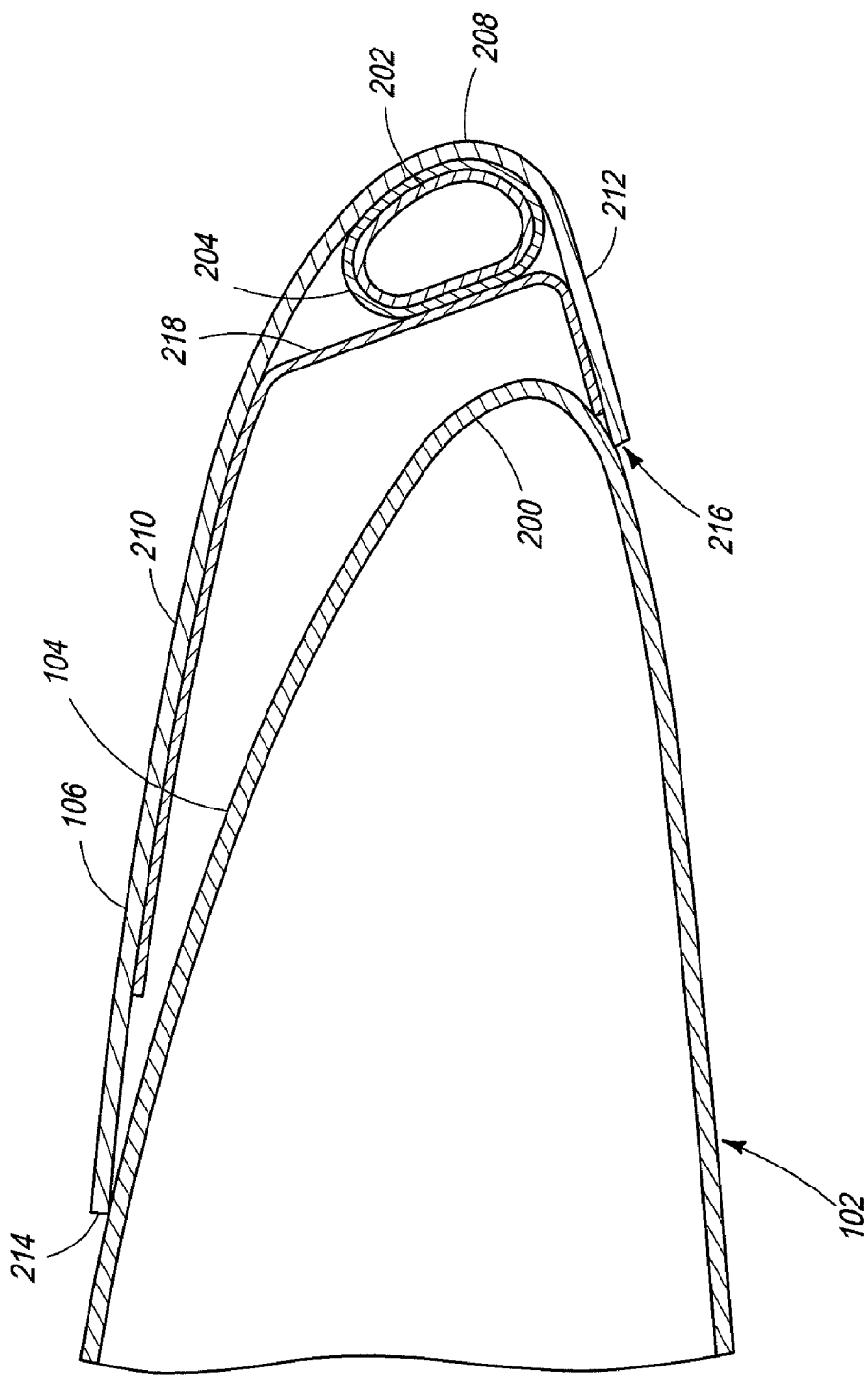
FIG. 2 is a cross-sectional view of an embodiment of the anti-icing piccolo tube standoff structure installed in the slat portion of an aircraft wing structure.

Referring now to FIG. 2, a cross-sectional view is provided of the wing 102 and the slat 106 in a retracted position. The wing 102 has an inner leading edge 200 located behind the slat 106 in the retracted position. The slat 106 comprises various other elements mounted inside its skin that have been removed here for purposes of clarity.

The piccolo tube 202 is a long tube formed from metal, such as aluminum, or composite materials that runs substantially along the length of slat 106. Some portions of the piccolo tube 202 may be formed from metal, while other sections of the tube 202 may be formed from composite materials. The standoff structure 204 is typically used only on sections of the piccolo tube that are formed from metal. The piccolo tube 202 has spray holes, shown more clearly in a later figure, that allow hot gases contained inside the piccolo tube to spray out against the inside surface of the slat 106 as desired.

The piccolo tube 202 is wrapped by a flexible standoff structure 204 that maintains a fixed separation between the piccolo tube 202 and the inside surface of slat 106. The flexible standoff structure 204 may be made of a variety of flexible, insulative materials that are resistant to high temperatures. In a preferred embodiment the standoff structure 204 is made from a sheet of polytetrafluoroethylene (PTFE), commonly known as teflon. The sheet utilized to form the standoff may be formed from other types of teflon or other similar materials. Other materials that may be utilized to form the standoff structure 204 include, but are not limited to, Fluoropolymers. The standoff 204 may be formed from a variety of sheet thicknesses including those from 0.010 inches to 0.250 inches thick. In a preferred embodiment of the standoff, a sheet of material 0.050 inches thick is used to form the standoff 204.

Hot engine bleed air or other heated gases are introduced into the piccolo tube 202 through supply duct 206 (not shown in FIG. 2), which itself is connected via ducts or hoses to the source of hot gas. The hot gas flows through the piccolo tube 202 and out adjacent to the slat leading edge 208 through the holes in the piccolo tube 202. The structure of the standoff structure 204 directs a portion of the hot gas from slat leading edge 208 across the inside surface of the slat top panel 210 and another portion of the hot gas from slat leading edge 208 across the inside surface of slat bottom panel 212. After flowing across the inside surfaces of the slat top and bottom panels, 210 and 212 respectively, the hot gas exits from the wing structure at the top and bottom slat edges, 214 and 216 respectively.

Slat spar 218 holds piccolo tube 202 and standoff structure 204 in place during operation. The standoff structure 204 does not require any direct attachment to slat 106 or slat spar 218 since it is held in place in between the slat spar 218 and the slat 106. Standoff structure 204 is attached to piccolo tube 202 by means of fasteners described in relation to a later figure. Channels in slat spar 218 allow the hot gas to flow back across the surface of the slat 106 and out the edges thereof.

Figure 3:
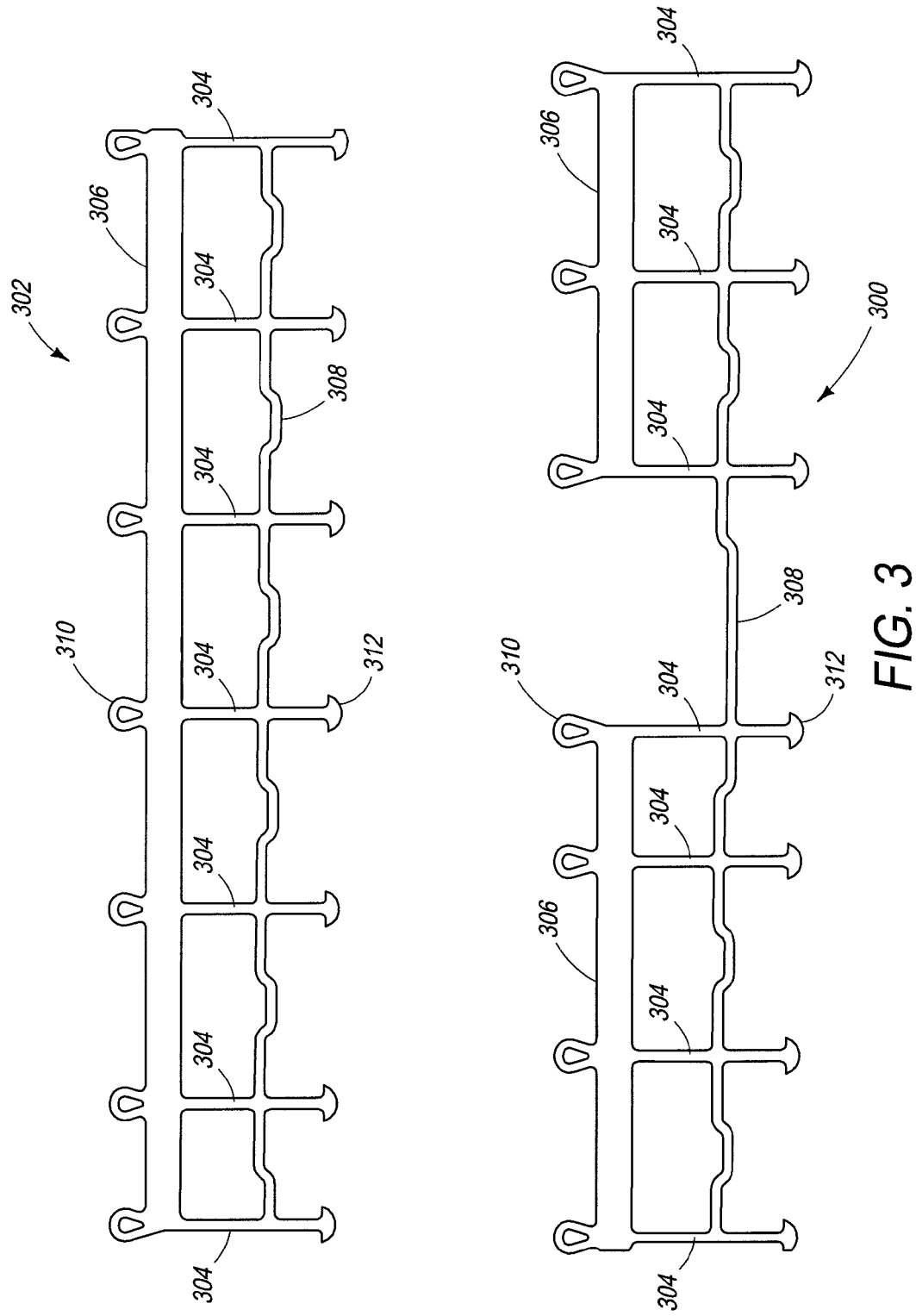
FIG. 3 is a top view of an embodiment of the anti-icing piccolo tube standoff structure in a flat configuration.

Referring now to FIG. 3, an embodiment of the standoff structure 204 is shown unfastened and removed from the piccolo tube 202, and laid flat. One embodiment of the standoff structure 204 comprises two separate pieces, the inboard standoff structure 300 and the outboard standoff structure 302. In other embodiments of the anti-icing piccolo tube standoff, the standoff structure 204 may comprise a single piece extending the length of the piccolo tube 202, or more than two pieces.

The standoff structure 204 has support ribs 304 that extend around the chordwise circumference of the piccolo tube 202 when installed thereon. The support ribs 304 are connected by a spanwise support bar 306. Support bar 306 generally runs the length of each piece of the standoff structure 204, however there may be breaks in the support bar 306 if necessary to allow for the structural and interconnecting elements of the structure of slat 106. The support bar 306 provides stability and strength to the standoff structure 204.

When the standoff structure 204 is installed on the piccolo tube 202, and the combination is installed in slat 106, the support bar 306 is sandwiched between piccolo tube 202 and slat spar 218 shown in FIG. 2. The pressure in the piccolo tube 202 caused by the injection of hot gas under pressure exerts a force on the interior surface of the piccolo tube 202. Since the piccolo tube 202 is not symmetrically cylindrical, but is somewhat "D" shaped when viewed cross-sectionally, the pressure of the hot gas could potentially deform the piccolo tube 202. This potential deformation is typically most pronounced along the flat aft wall of piccolo tube 202. Support bar 306 runs along the length of piccolo tube 202 in the middle of the flat aft wall and provides support from the slat spar 218 to prevent deformation of the piccolo tube 202.

The standoff structure 204 also has a spanwise diverter bar 308 between the support ribs 304. The diverter bar 308 is designed to direct the hot gas from the piccolo tube spray holes across the top and bottom of the inside surface of the slat 106. In order to perform this function, embodiments of the diverter bar 308 may be shaped in such a manner that some spray holes are located to one side of the diverter bar 308 while other spray holes are located to the other side of the diverter bar 308. The actual shape of the diverter bar 308 will differ in different embodiments of the invention as necessary depending on the arrangement of spray holes in the piccolo tube.

In a preferred embodiment of the standoff structure, support ribs 304 and bar 306 and diverter bar 308 are formed by removing material from a continuous sheet of the flexible material, and are thus a unified element, not an assemblage of discrete parts. In a preferred embodiment, a water jet is utilized to simultaneously cut through one or more sheets of PTFE.

When installed on piccolo tube 202 and installed in slat 106, the diverter bar 308 and the support ribs 304 create cavities between the piccolo tube 202 and the inner surface of the skin of slat 106. Each cavity has one or more spray holes that introduce hot gas into the cavity, and the pressure of incoming hot gas forces the gas to circulate either up and over the piccolo tube 202 along the inner surface of the slat top panel 210, or down and under the piccolo tube 202 along the inner surface of the slat bottom panel 212. In the absence of diverter bar 308, the hot gas would not flow evenly over both the slat top panel 210 and slat bottom panel 212.

During installation on the piccolo tube 202, the standoff structure 204 is folded into a tubular configuration and held in place by eyes 310 and hooks 312. Hooks 312 are twisted ninety (90) degrees from the plane of the flat standoff structure 204, inserted through the hole in eyes 310, and then twisted back to the original configuration. The hook 312 and eye 310 can be seen in a linked configuration in FIGS. 4, 5 and 6. Once all the hooks 312 and eyes 310 have been linked, the standoff structure 204 is slid over the piccolo tube from the outboard end of thereof. If the standoff structure 204 is formed from multiple pieces, the most inboard piece is slid over the outboard end of piccolo tube 202 in an inboard direction until it is located in the correct location. Each piece is then slid onto the tube 202 from the most inboard until the most outboard has been installed on the tube 202.

The piccolo tube is slightly tapered with the narrow end located outboard, so as the standoff structure 204, or each piece thereof, reaches its proper location on the tube the fit becomes snug without further adjustment. The snug fit is achieved when the support ribs 304 begin to stretch and cause tension in the material of the ribs 304. The tension creates a force pulling the hook and eye together which locks both in place. The standoff structure 204 is then attached to the piccolo tube 202 by pull fasteners, more specifically described in relation to FIG. 4.

The support ribs 304 and the diverter bar 308 not only direct the flow of hot gas from the spray holes in the piccolo tube, they also maintain the appropriate standoff distance between the piccolo tube 202 and the interior surface of the skin of slat 106. The flexible nature of the PTFE material used for the standoff 204 conforms to the piccolo tube 202 and the inner surface of the slat 106 preventing leaks around the support ribs 304 and the diverter bar 308 as would happen with any standoff that was not able to conform to the variations in the tube and slat surfaces. The standoff 204 also prevents excessive heat transfer from the heated piccolo tube 202 to the slat 106, except through the circulation of hot gas as desired.

Figure 4:
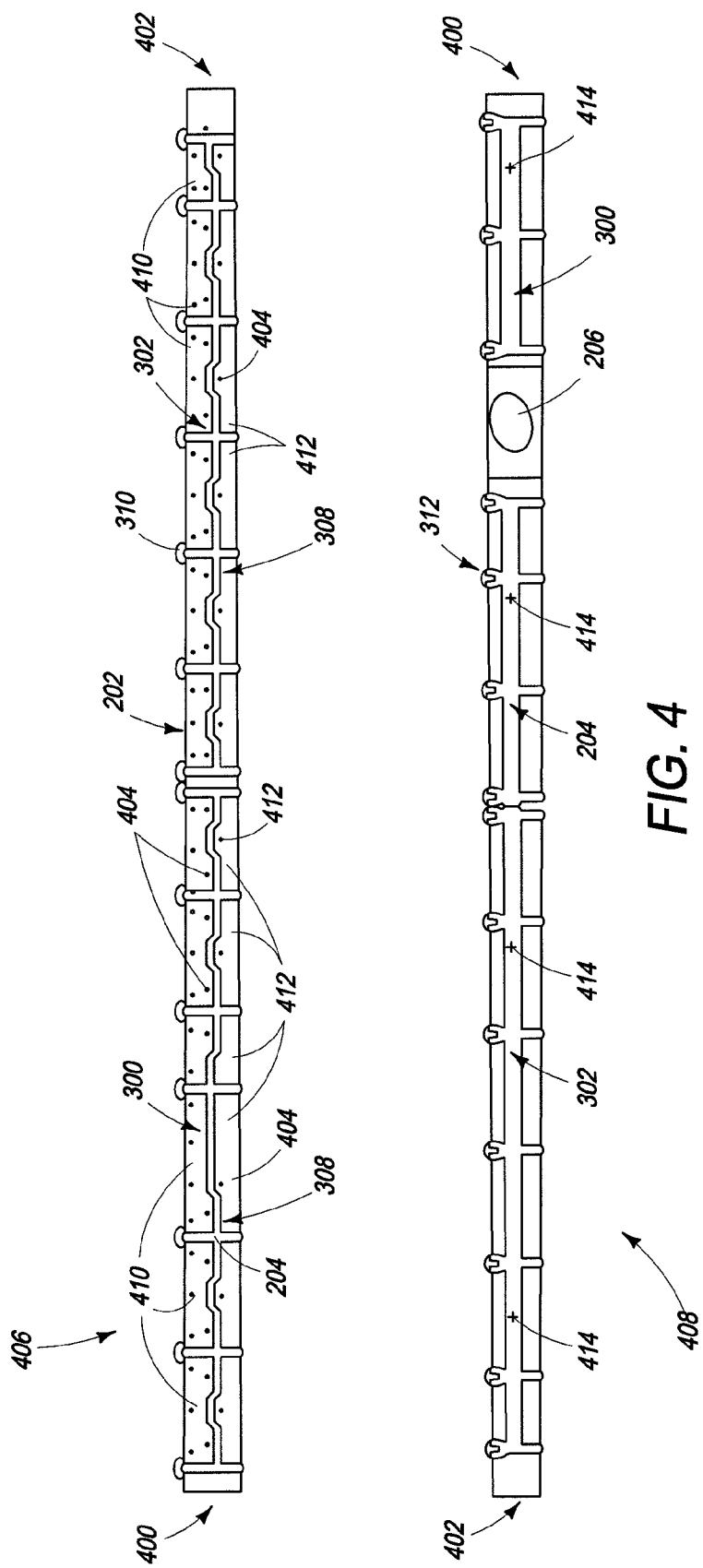
FIG. 4 is front and back views of an embodiment of the anti-icing piccolo tube standoff structure before installation in the slat.

Referring now to FIG. 4, an embodiment of the anti-icing piccolo tube standoff structure is shown with the standoff structure 204 installed on the piccolo tube 202. The piccolo tube 202 tapers slightly from inboard end 400 to outboard end 402. Piccolo tube 202 has a plurality of spray holes 404 located on the forward face 406 of piccolo tube 202. In the embodiment of the tube 202 shown, there are three rows of spray holes 404, with the top two rows having holes 404 with a diameter of 0.042 inches and the bottom row having holes with a diameter of 0.047 inches. Other piccolo tubes 202 for use with the standoff structure 204 may have different numbers or arrangements of spray holes 404, and the diverter bar 308 in embodiments of the standoff structure 204 for use on those alternative piccolo tubes 202 must be redesigned to accommodate the spray hole pattern thereof.

The spray holes 404 are located in the forward face 406 of piccolo tube 202, which when installed on slat 106, will be immediately adjacent to the slat leading edge 208. The aft face 408 of piccolo tube 202, when installed, is immediately adjacent to slat spar 218.

Standoff structure 204 is shown in FIG. 4 installed on piccolo tube 202 with ribs 304 and hook 312 and eye 310 maintaining the standoff 204 in place. The taper of piccolo tube 102 allows the standoff structure 204 to be formed into a cylinder by connecting hooks 312 to eyes 310 separately, and then sliding the standoff structure 204 over the outboard end 402 of piccolo tube 102 into the correct position.

Diverter bar 308 divides the spray holes 404 into those located in an upper areas 410 and those located in lower areas 412. In a preferred embodiment approximately two-thirds of the spray holes will be above the diverter bar 308 and the air from those spray holes 404 will be directed across the inner surface of the slat top panel 210. The remaining hot gas will be directed across the inner surface of the slat bottom panel 212.

The standoff structure 204 is attached to the piccolo tube 202 at four locations 414 on the support bar 306. The fasteners may be any type of pull or push fastener such as pull rivets.

Figure 5:
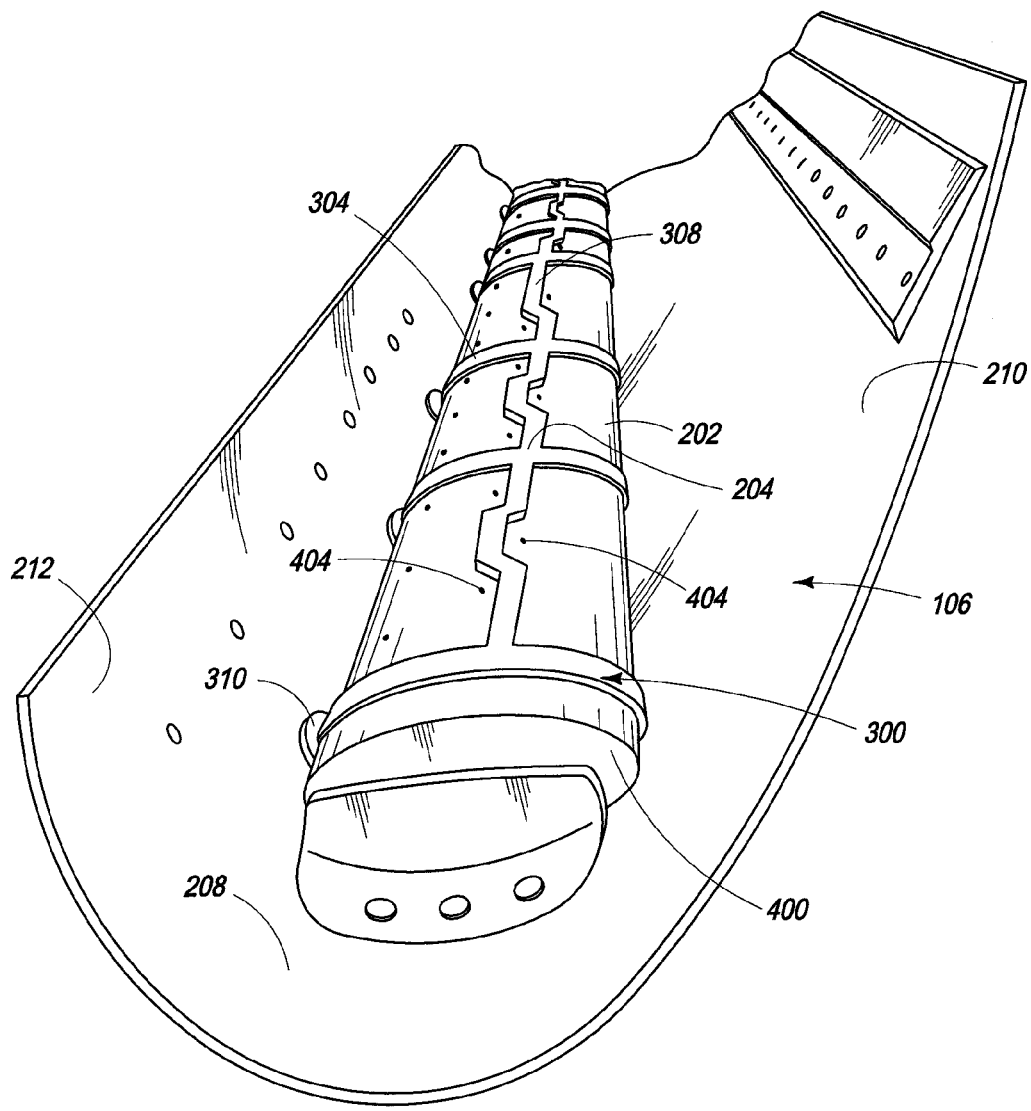
FIG. 5 is a perspective view of an embodiment of the anti-icing piccolo tube standoff structure during installation in a slat on the wing of an aircraft.

Referring now to FIG. 5, a perspective view is shown of a slat 106, removed from a wing 102, containing a piccolo tube 202 and standoff structure 204. Other support and structural elements of slat 106 are not show here for clarity. During actual operation of the piccolo tube 202 it is rotated 180 degrees from this position, along the axis of the piccolo tube 202. The piccolo tube 202 and standoff structure 204 are shown with the forward face 406, which is normally adjacent to the slat, turned away from the slat for easier viewing. Both inboard 300 and outboard 302 standoff structures have been installed on piccolo tube 202 as described above.

Figure 6:
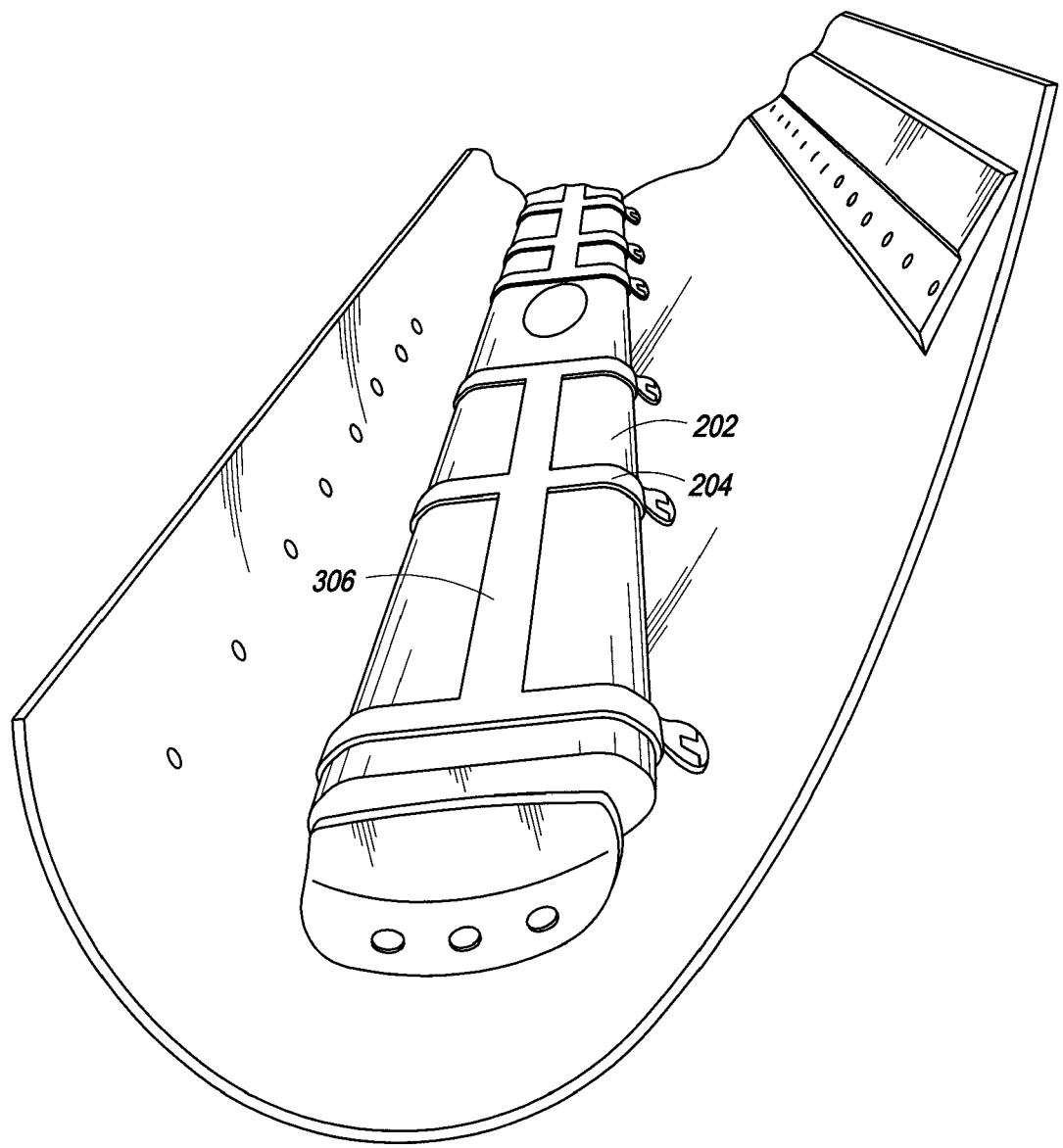
FIG. 6 is a perspective view of an embodiment of the anti-icing piccolo tube standoff structure during installation in a slat on the wing of an aircraft.

Referring now to FIG. 6, a perspective view is shown of a slat 106, removed from a wing 102, containing a piccolo tube 202 and standoff structure 204. The piccolo tube 202 has been rotated 180 degrees along its cylindrical axis from the view shown in FIG. 5, and is shown in FIG. 6 in final installation configuration. Support bar 306 runs along the length of piccolo tube 202, connecting ribs 304 which support and maintain the tube 202 in relation to the slat 106.

What is claimed is:

1. A standoff structure for supporting an anti-icing piccolo tube in a leading edge of an aircraft structure comprising:
    a plurality of flexible support ribs disposed substantially parallel to each other;
    a support bar and a diverter bar disposed substantially parallel to each other;
    wherein the support bar and the diverter bar are disposed substantially perpendicular to and in connection with the plurality of support ribs;
        wherein the plurality of support ribs, the support bar and diverter bar are formed from a continuous sheet of flexible material.

2. The standoff structure of claim 1 wherein the continuous sheet of flexible material is polytetrafluoroethylene.

3. The standoff structure of claim 1 wherein the continuous sheet of flexible material is an insulator.

4. The standoff structure of claim 1 wherein the diverter bar directs hot gas from the piccolo tube across the inner surface of the leading edge.

5. The standoff structure of claim 2 wherein each of the support ribs further comprises a hook structure on a first end of each support rib, and an eye structure on a second end of each support rib.

6. The standoff structure of claim 5 wherein the hook structure is inserted into the eye structure to secure the standoff structure in a substantially cylindrical configuration.

7. The standoff structure of claim 1 wherein the diverter bar is disposed between the piccolo tube and a leading edge of the slat.

8. The standoff structure of claim 7 where the support bar is disposed between the piccolo tube and a spar in the aircraft structure.

9. A flexible structure for supporting an anti-icing tube in a slat in an aircraft wing comprising:
    a plurality of cylindrical support members;
    a support bar; and
    a diverter bar;
    wherein the plurality of cylindrical support members, the support bar and the diverter bar are formed from a continuous sheet of flexible material.

10. The flexible structure of claim 9 wherein the cylindrical support members are disposed substantially parallel to each other.

11. The flexible structure of claim 10 wherein the support bar and the diverter bar are disposed substantially perpendicular to and connected to the cylindrical support members.

12. The flexible structure of claim 11 wherein the diverter bar separates the anti-icing tube from a leading edge of the aircraft wing, and directs hot gas from the anti-icing tube across the inner surface of the leading edge of the aircraft wing.

13. A method for supporting an anti-icing piccolo tube in a slat on the wing of an aircraft, comprising the steps of:
    providing a piccolo tube containing spray holes for delivering hot gases to a leading edge of the slat;
    providing a flexible standoff structure formed from a continuous sheet of flexible material for supporting the piccolo tube a fixed distance from the leading edge of the slat and directing the flow of hot gas from the spray holes to the leading edge of the slat; and
    heating the slat by forcing hot gases through the piccolo tube and the standoff structure;
    wherein said flexible standoff stucture is comprised of support ribs, a diverter bar and a support bar.

14. The method of claim 13 wherein the step of providing a flexible standoff structure comprises:
    fastening the flexible standoff structure into a cylindrical configuration; and
    inserting the piccolo tube into the flexible standoff structure.

15. The method of claim 13 wherein the step of heating the slat further comprises:
    providing hot gases to the interior of the piccolo tube;
    spraying hot gas through the spray holes in the piccolo tube onto the inner surface of the slat;
    directing the hot gas from a first set of spray holes across the inner surface of the top panel of the slat;
    directing the hot gas from a second set of spray holes across the inner surface of the bottom panel of the slat.

* * * * *